J. Morgan.
9652X Spinning Mach.
Patented May 14, 1836.
No Printed Specification Available
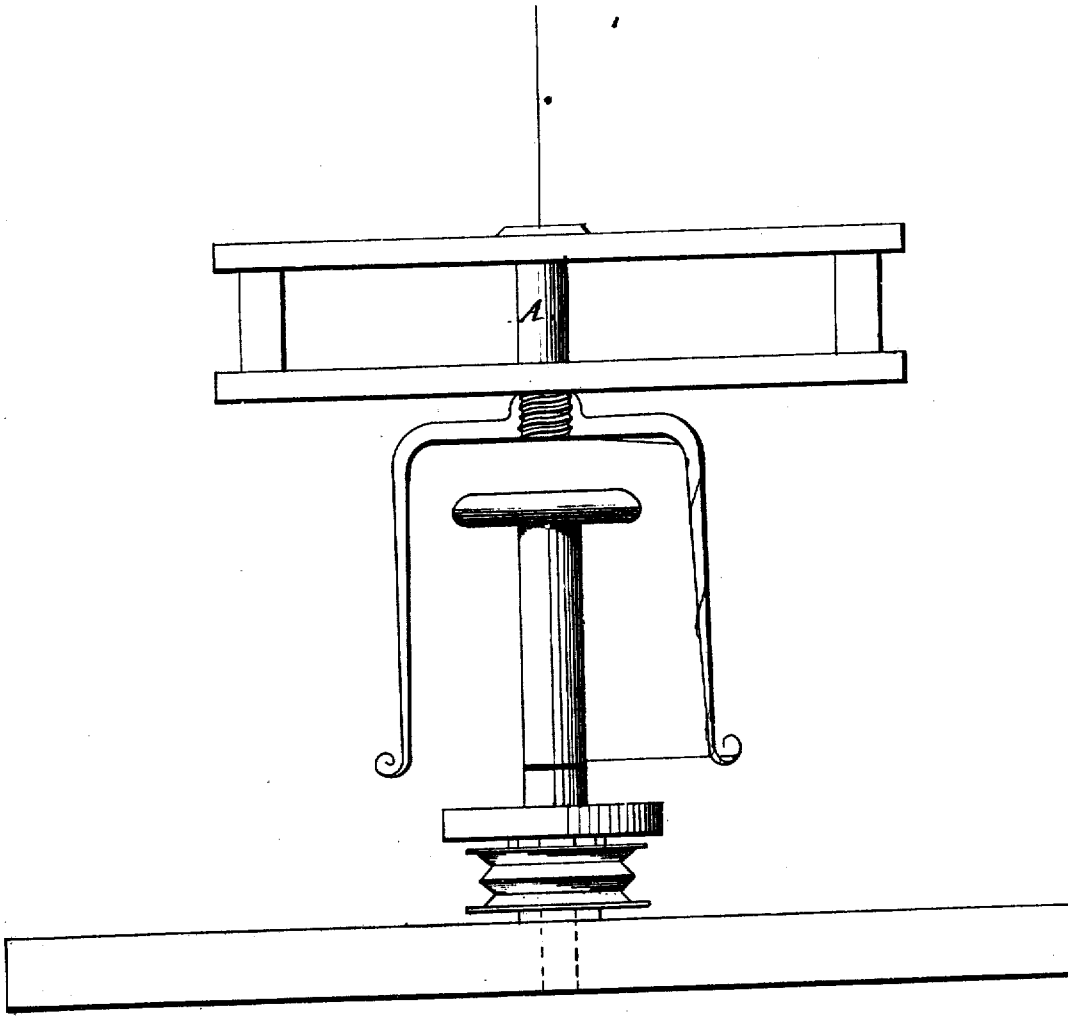
H. PETERS, PHOTO-LITHOGRAPHER, WASHINGTON, D. C.

John Morgan of Manayunk, in Pennsylvania

Letters Patent.

The schedule referred to in these Letters Patent and making part of the same containing a description in the words of the said John Morgan himself of his improvement in spinning wool, Cotton, and other fibrous substances To all whom these presents shall come, Be it known that I John Morgan of the town of Manayunk in the County of Philadelphia and State of Pennsylvania Cotton Spinner, have invented a new and useful improvement in wool and cotton spinning and other fibrous substancy and that the following is a full and exact description thereof, 1. a spindle, 2. a tube Hollow, 3. two brass railings, 4. a flyer, 5. a drag. And the following is the manner of using and the mode in which I contemplate the application of that principle or character by which it may be distinguished from other inventions to wit; The flyer is attached to the tube at the bottom under the two Brass Railings, to which is attached the Drag which may be applied in a variety of ways as follows A leather strap, steel spring, & set screw,

What I claim as my own invention and not previously known in the above described Machine or piece of machinery, is the Tube and Drag attached to the flyer (see plate Figure [illegible],) and which operates by the power of the thread alone. The advantages of this invention are, that in spinning it works with less power makes less waste and more yarn from the same Cotton, wool, or other fibrous substances.

Witnesses Thomas Mosely
John Whitehead

John Morgan

299 [illegible] [illegible]

(Drawing)